United States Patent
Kagoshima et al.

(10) Patent No.: US 7,069,673 B2
(45) Date of Patent: Jul. 4, 2006

(54) HYBRID CONSTRUCTION EQUIPMENT POWER CONTROL APPARATUS

(75) Inventors: Masayuki Kagoshima, Kobe (JP); Toshio Sora, Kobe (JP); Masayuki Komiyama, Kobe (JP)

(73) Assignees: Kabushiki Kaisha Kobe Seiko Sho (Kobe Steel, Ltd.), Kobe (JP); Kobelco Construction Machinery Co., Ltd., Hiroshima (JP)

( * ) Notice: Subject to any disclaimer, the term of this patent is extended or adjusted under 35 U.S.C. 154(b) by 400 days.

(21) Appl. No.: 10/475,095

(22) PCT Filed: Apr. 26, 2002

(86) PCT No.: PCT/JP02/04232

§ 371 (c)(1),
(2), (4) Date: Oct. 27, 2003

(87) PCT Pub. No.: WO02/089290

PCT Pub. Date: Nov. 7, 2002

(65) Prior Publication Data

US 2004/0148817 A1 Aug. 5, 2004

(30) Foreign Application Priority Data

Apr. 27, 2001 (JP) ............................. 2001-130498

(51) Int. Cl.
*E02F 5/02* (2006.01)
*G05D 1/02* (2006.01)

(52) U.S. Cl. ...................... 37/348; 37/414; 701/50; 60/420

(58) Field of Classification Search .................. 37/348, 37/414, 396; 701/50; 60/400, 420, 431
See application file for complete search history.

(56) References Cited

U.S. PATENT DOCUMENTS

| | | | | |
|---|---|---|---|---|
| 4,833,798 | A * | 5/1989 | Ehrich | 37/414 |
| 5,488,787 | A * | 2/1996 | Aoyagi et al. | 37/348 |
| 5,808,428 | A | 9/1998 | Ito et al. | |
| 5,945,808 | A | 8/1999 | Kikuchi et al. | |
| 6,199,307 | B1 * | 3/2001 | Kagoshima et al. | 37/443 |
| 6,745,117 | B1 * | 6/2004 | Thacher et al. | 701/50 |
| 6,789,335 | B1 * | 9/2004 | Kinugawa et al. | 37/348 |
| 6,820,356 | B1 * | 11/2004 | Naruse et al. | 37/348 |
| 2002/0104239 | A1 * | 8/2002 | Naruse et al. | 37/348 |

FOREIGN PATENT DOCUMENTS

| | | |
|---|---|---|
| EP | 1 219 751 A1 | 7/2002 |
| JP | 07-011851 | 2/1995 |
| JP | 2000-283107 | 10/2000 |
| JP | 2001-003397 | 1/2001 |
| JP | 2001-003398 | 1/2001 |
| JP | 2001-011901 | 1/2001 |
| JP | 2001-016891 | 1/2001 |
| WO | 99/21261 | 4/1999 |

* cited by examiner

*Primary Examiner*—Thomas A Beach
(74) *Attorney, Agent, or Firm*—Oblon, Spivak, McClelland, Maier & Neustadt, P.C.

(57) ABSTRACT

Maximum charging power of a battery (63) is set by a battery-charging power setting unit (75), while maximum discharging power of the battery (63) is set by a battery-discharging power setting unit (76). Lower and upper limit of generator output power is set by a generator output power setting unit (77). A generator/battery power distribution determining unit (81) distributes power between the battery (63) and the generator (62) using the set values above.

7 Claims, 11 Drawing Sheets

HYBRID CONSTRUCTION EQUIPMENT POWER CONTROL APPARATUS

TECHNICAL FIELD

The present invention relates to a power controller for controlling output power of generator and charging/discharging power of electrical energy storage unit, both installed in hybrid construction machine.

BACKGROUND ART

Engine for self-traveling has been installed in construction machine such as hydraulic excavators and the like, the engine operating as a power source to drive hydraulic pump and supply each hydraulic actuator such as rotating actuators, boom cylinders, arm cylinders etc. with hydraulic oil discharged from the hydraulic pump, to drive each portion. However, known construction machine using engine as power source suffer from problems in that they burn too much gas due to large load fluctuation and inordinate burden to the engine, and that they generate noise and/or exhaust gas emissions. Accordingly, hybrid construction machine containing motors driven by combination of generator and electrical energy storage unit (battery) have been developed to overcome the foregoing deficiencies. As examples of the hybrid construction machine, there have been provided a series system one disclosed in Japanese Patent Laid-Open Publication No. 2000-283107 and a parallel system one disclosed in Japanese Patent Laid-Open Publication No. Hei 10-42587/Laid-Open Publication No.2000-226183 etc.

Generally in either system of the hybrid construction machine above, voltage between battery terminals has been measured and the battery state-of-charge SOC has been calculated based on the measurement results. Then, generator has been operated when the state-of-charge SOC become a specified value or less, while the generator has been halted, or the output of the generator has been reduced when the state-of-charge SOC become the specified value or more. With such control, the state-of-charge SOC of the battery has been kept within a specified range.

However, the foregoing state-of-charge SOC based control have suffered from the problem in that halting generator, or reducing the output of the generator caused drop of efficiencies of engine and generator in case of small load and high state-of-charge SOC. In addition, the foregoing state-of-charge SOC based control in the same case above have also suffer from the problem in that there might be a situation that electric actuators might not be supplied with electric power required for its operation because of time-lag to restart engine once halted, and it was required to increase battery capacity to overcome the problem. Therefore, it was difficult to achieve the conditions simultaneously of supplying appropriate electric power required for electric actuator, controlling battery state-of-charge, operating engine and generator highly efficiently. For example, if it was prioritized to operate engine and generator highly efficiently, battery capacity was resulted in increase in case of small load of electric actuator, and therefore it was difficult to control battery state-of-charge SOC within a specified range. In contrast, if it was prioritized to control battery state-of-charge SOC within a specified range, output power fluctuation due to load fluctuation of engine and generator was resulted in increase, and therefore efficiencies of engine and generator drop.

In addition, charging/discharging over battery capacity in case of low battery temperature would have been likely to cause the performance deterioration of the battery because of battery characteristics that charging/discharging capacity depend on its temperature. Further, controlling only based on battery state-of-charge SOC would have been likely to cause the increase of loss because losses of battery and generator vary with output powers of generator and battery respectively while internal loss of battery varies with input power of the battery.

DISCLOSURE OF THE INVENTION

Accordingly, an object of the present invention is to provide a power controller for hybrid construction machine which makes it possible to prevent performance deterioration of its battery due to charging/discharging over the battery capacity as well as to improve fuel consumption of its engine. It is another object of the present invention to provide a power controller for hybrid construction machine, which makes it possible to improve fuel consumption of its engine.

A power controller for hybrid construction machine of the present invention, including an engine, a generator which is driven by the engine, an electrical energy storage unit to store electric power generated by the generator, and one or more electric actuators driven by the generator and the electrical energy storage unit, is characterized by comprising a load power detecting means to detect required power for the one or more electric actuators; a charging power setting means to set maximum value of charging power of the electrical energy storage unit; a discharging power setting means to set maximum value of discharging power of the electrical energy storage unit; a generator output power setting means to set upper limit and lower limit value of the output power of the generator; a power distribution determining means to determine power distribution between the generator and the electrical energy storage unit based on the set value by the charging power setting means, the set value by the discharging power setting means, the set value by the generator output power setting means, and the required power as the detection result by the load power detecting means; a generator power controlling means to control output power of the generator based on the determined power distribution as the determination result by the power distribution determining means; and a power controlling means for electrical energy storage unit to control charging/discharging power of the electrical energy storage unit based on the determination result by the power distribution determining means.

The power controller for hybrid construction machine above makes it possible to improve fuel consumption of the engine as well as to prevent performance deterioration of the electrical energy storage unit if upper limit and lower limit value of the generator are set within a range to operate the engine and the generator highly efficiently, and maximum value of charging/discharging power for the electrical energy storage unit is set so that the electrical energy storage unit is not charged/discharged over its capacity.

The power controller for hybrid construction machine mentioned above is characterized by further comprising a state-of-charge detecting means to detect state-of-charge of the electrical energy storage unit, wherein the generator output power setting means sets upper limit and lower limit value of the output power of the generator based on the detected state-of-charge as the detection result by the state-of-charge detecting means. This power controller makes it possible to control output power of the generator and charging/discharging power of the electrical energy storage unit according to the state-of-charge of the electrical energy storage unit, wherein the upper limit and the lower limit value of output power of the generator are set according to the state-of-charge of the electrical energy storage unit.

The power controller for hybrid construction machine mentioned above is characterized by further comprising a state-of-charge detecting means to detect state-of-charge of the electrical energy storage unit, wherein the charging power setting means sets maximum value of the charging power of the electrical energy storage unit based on the detection result by the state-of-charge detecting means, and the discharging power setting means sets maximum value of the discharging power of the electrical energy storage unit based on the detection result by the state-of-charge detecting means. This power controller makes it possible to prevent performance deterioration of the electrical energy storage unit due to charging/discharging over its capacity as a result of prevention of charging/discharging over the capacity regardless of the state-of-charge of the electrical energy storage unit, wherein maximum values of the charging power and the discharging power of the electrical energy storage unit are set according to its state-of-charge even though the charging/discharging capacity of the electrical energy storage unit varies depending on its state-of-charge.

The power controller for hybrid construction machine mentioned above is characterized by further comprising a temperature detecting means to detect temperature of the electrical energy storage unit, wherein the charging power setting means sets maximum value of the charging power of the electrical energy storage unit based on the detected temperature as the detection result by the temperature detecting means, and the discharging power setting means sets maximum value of the discharging power of the electrical energy storage unit based on the detection result by the temperature detecting means. This power controller makes it possible to prevent performance deterioration of the electrical energy storage unit due to charging/discharging over its capacity as a result of prevention of charging/discharging over the capacity regardless of the temperature of the electrical energy storage unit, wherein maximum values of the charging power and the discharging power of the electrical energy storage unit are set according to its temperature even though the charging/discharging capacity of the electrical energy storage unit varies depending on its temperature.

Another power controller for hybrid construction machine of the present invention, including an engine, a generator which is driven by the engine, an electrical energy storage unit to store electrical power generated by the generator, and one or more electric actuators driven by the generator and the electrical energy storage unit, is characterized by comprising a load power detecting means to detect required power for the one or more electric actuators; a power distribution determining means to determine power distribution between the generator and the electrical energy storage unit to maximize power consumption efficiency by the engine, utilizing the required power detected by the load power detecting means, the loss characteristics of the generator and the engine against an output power of the generator, and the loss characteristics of the electrical energy storage unit against an input power of the electrical energy storage unit; a generator power controlling means to control output power of the generator based on the determined power distribution as the determination result by the power distribution determining means; and a power controlling means for electrical energy storage unit to control input power of the electrical energy storage unit based on the determination result by the power distribution determining means.

The power controller for hybrid construction machine mentioned above makes it possible to improve fuel consumption of the engine caused by reducing total energy loss of the hybrid construction machine, wherein output power of the generator and charging/discharging power of the electrical energy storage unit are determined taking into consideration the loss characteristics of the generator and the engine against the output power of the generator, and the loss characteristics of the electrical energy storage unit against the input power of the electrical energy storage unit.

The power controller for hybrid construction machine mentioned above is characterized by further comprising a temperature detecting means to detect temperature of the electrical energy storage unit; and a power loss characteristics determining means for electrical energy storage unit to determine the loss characteristics of the electrical energy storage unit against the input power of the electrical energy storage unit based on the detection result by the temperature detecting unit. This power controller makes it possible to improve fuel consumption of the engine caused by reducing energy loss regardless of the temperature of the electrical energy storage unit, wherein the loss characteristics above is determined according to the temperature of the electrical energy storage unit.

The power controller for hybrid construction machine mentioned above is characterized by further comprising a state-of-charge detecting means to detect state-of-charge of the electrical energy storage unit; and a power loss characteristics determining means for electrical energy storage unit to determine the loss characteristics of the electrical energy storage unit against the input power of the electrical energy storage unit based on the detection result by the state-of-charge detecting unit. This power controller makes it possible to improve fuel consumption of the engine caused by reducing energy loss regardless of the state-of-charge of the electrical energy storage unit, wherein the loss characteristics above is determined according to the state-of-charge of the electrical energy storage unit.

BEST MODE FOR CARRYING OUT THE INVENTION

The present invention will be more fully understood from the following description of preferred embodiments when reference is made to the accompanying drawings. Though a series system hybrid excavator is described below as an example of a hybrid construction machine, the present invention is also applicable for various types of hybrid construction machine such as parallel system ones etc.

First embodiment

A power controller for hybrid excavator according to a first embodiment of the present invention will be described below referring to the accompanying drawings.

At first, a hybrid excavator to which a power controller according to the first embodiment is applied will be described referring to FIG. 1. It should be noted that FIG. 1 is a view showing a frame format of an outline configuration of a hybrid excavator.

Figure 1:
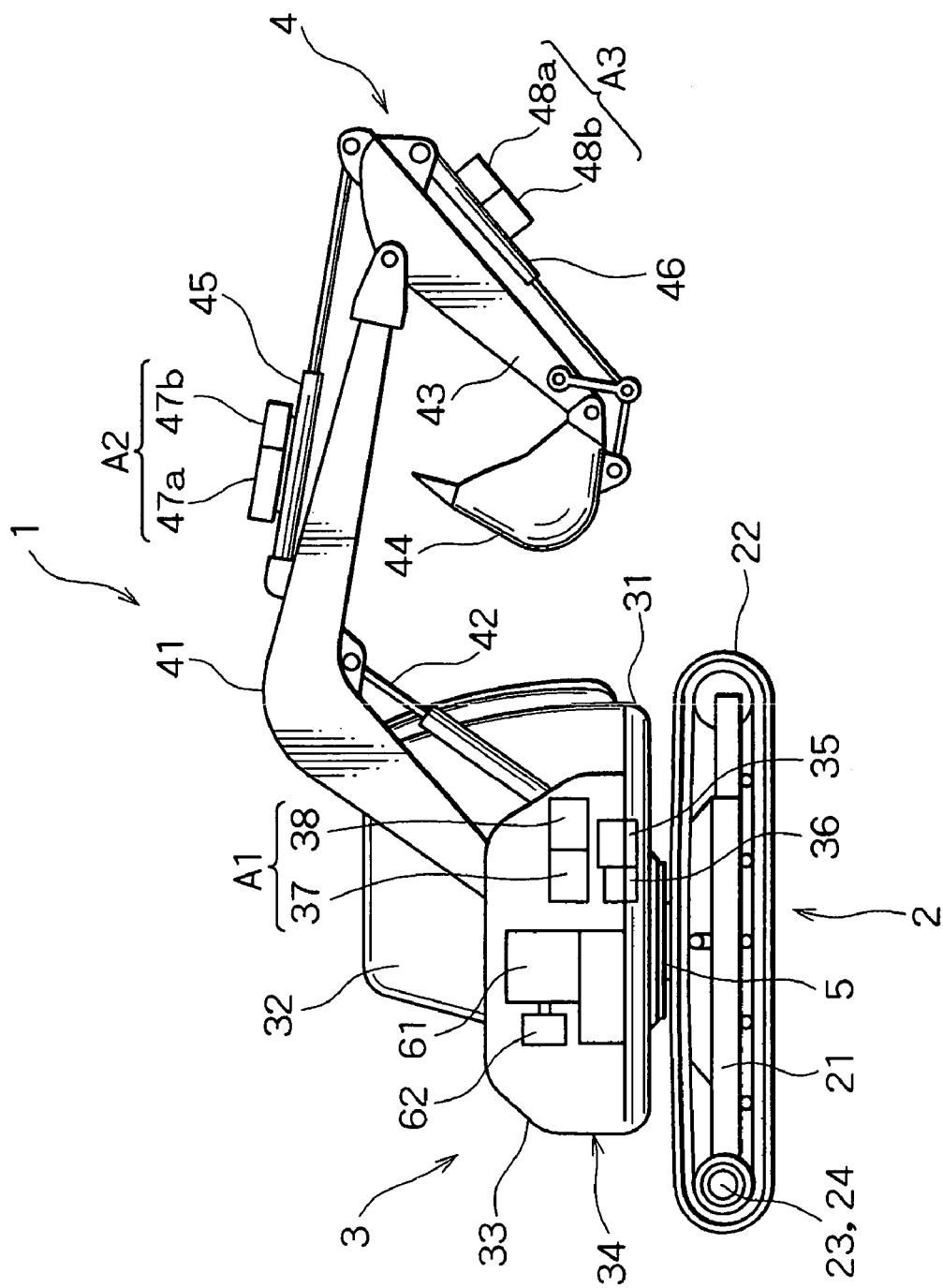
FIG. 1 is a view showing a frame format of an outline configuration of a hybrid excavator to which a power controlling mechanism of a first embodiment of the present invention is applied.

In FIG. 1, a hybrid excavator 1 comprises a lower traveling body 2, an upper rotating body 3 which is connected rotatably to the center portion of the upper surface of the lower traveling body 2, and an excavating attachment 4 which is connected to the front portion of the upper rotating body 3.

The lower traveling body 2 includes a pair of crawler frames 21 arranged at the both ends in parallel, a crawler 22 configured rotatably around each crawler frame 21 to contact on the ground surface planarly, a motion reducer 23 and a motor 24 to drive in rotation the crawler 22. The lower traveling body 2 composed as described above drives in forward and reverse, revolves, rotates the entire hybrid excavator 1, driving in rotation each crawler 22 forward and backward respectively through the motion reducer 23 by the motor 24.

A pivot 5 as rotating axis is configured orthogonal to the lower traveling body 2 at the center portion of the upper surface of the lower traveling body 2. The rotating frame 31 that forms a part of the upper rotating body 3 is connected to the upper portion of the pivot 5 pivotally. At the upper surface of the rotating frame 31, there is configured a cabin 32 for operator's cockpit and a machine housing 34 covered with a protective cover 33 as well as one end of a boom 41 and a boom cylinder 42 of the excavating attachment 4 axially up and down.

In the machine housing 34, there is a rotating motor 35 and a rotating motion reducer 36 as well as an integrated actuator A1 for boom comprising a boom motor 37 and a boom pump 38 in an integrated manner. The rotating motor 35 drives in rotating motion the rotating frame 31 through the rotating motion reducer 36 with the pivot 5 being a guided center. The integrated actuator A1 is connected to the boom cylinder 42 through an unillustrated hydraulic pipe, and drives the end side of the boom 41 up and down.

At the end of the boom 41, an arm 43 is connected pivotally. At the end of the arm 43, a bucket 44 is connected pivotally. In addition, the boom 41 and the arm 43 are connected to each other through an arm cylinder 45, while the arm 43 and the bucket 44 are connected to each other through a bucket cylinder 46. For these cylinders 45 and 46, there are configured an integrated actuator A2 for arm and an integrated actuator A3 for bucket respectively, wherein the integrated actuator A2 comprises an arm motor 47a and an arm pump 47b in an integrated manner while the integrated actuator A3 comprises a bucket motor 48a and a bucket pump 48b in an integrated manner. Each actuator A2, A3 moves forward and backward each cylinder rod of the cylinder 45, 46 by hydraulic pressure to drive the arm 43 and the bucket 44 respectively axially up and down.

In the machine housing 34, there are installed an engine 61, a generator 62 to generate AC power according to speed (engine power) of the engine 61, as well as a battery 63 (an electrical energy storage unit) etc.

Next, a power controlling mechanism of the hybrid excavator 1 having the configuration above will be described referring to FIG. 2. It should be noted that FIG. 2 is a block diagram illustrating the power controlling mechanism of the hybrid excavator 1.

Figure 2:
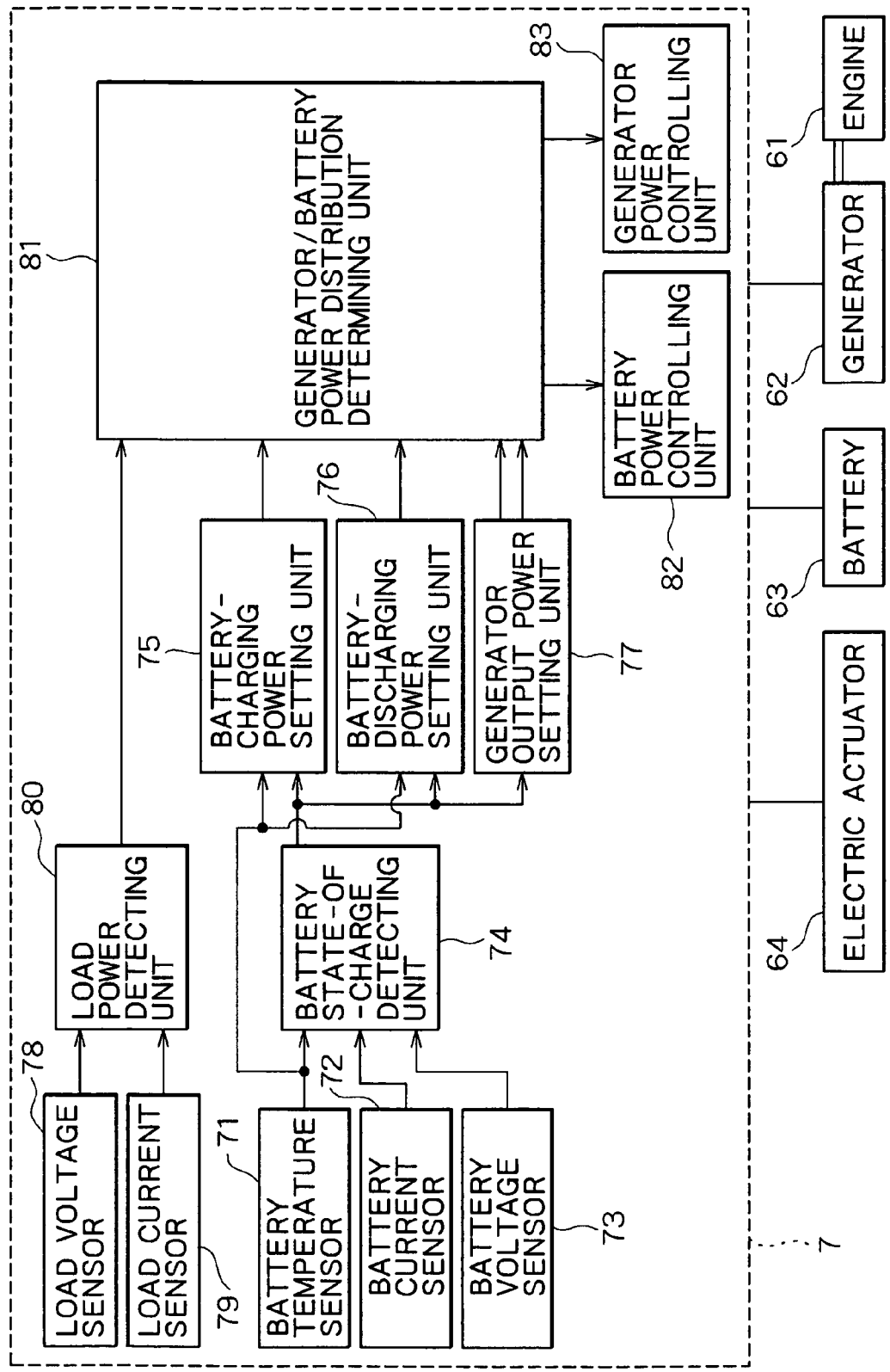
FIG. 2 is a block diagram illustrating the power controlling mechanism of the hybrid excavator shown in FIG. 1.

The block diagram shown in FIG. 2 consists of the engine 61, a generator 62, a battery 63 to store surplus power generated by the generator 62 and to supply an electric actuator 64 with power appropriately, the electric actuator 64, and a power controlling mechanism 7, wherein the power supply from the battery 63 to the electric actuator 64 and that from the generator 62 to the electric actuator 64 or the battery 63 are made through DC (direct current) voltage lines. The electric actuator 64 represents either the integrated actuator A1 for boom, the integrated actuator A2 for arm or the integrated actuator A3 for bucket etc., only one out of which being illustrated in FIG. 2.

The power controlling mechanism 7 shown in FIG. 2 comprises a battery temperature sensor 71, a battery current sensor 72, a battery voltage sensor 73, a battery state-of-charge detecting unit 74, a battery-charging power setting unit 75, a battery-discharging power setting unit 76, a generator output power setting unit 77, a load voltage sensor 78, a load current sensor 79, a load power detecting unit 80, a generator/battery power distribution determining unit 81, a battery power controlling unit 82, and a generator power controlling unit 83.

The battery temperature sensor 71 detects temperature of the battery 63 and outputs a battery temperature $TEMP_b$ as a detection result at the battery state-of-charge detecting unit 74, the battery-charging power setting unit 75, and the battery-discharging power setting unit 76. The battery current sensor 72 detects output current of the battery 63 and outputs an output current $I_b$ as a detection result at the battery state-of-charge detecting unit 74. The battery voltage sensor 73 also detects voltage between terminals of the battery 63 and outputs a voltage between terminals $V_b$ as a detection result at the battery state-of-charge detecting unit 74.

The battery state-of-charge detecting unit 74 calculates power of the battery 63 using the output current $I_b$ of the battery 63 inputted from the battery current sensor 72 and the voltage $V_b$ between terminals of the battery 63 inputted from the battery voltage sensor 73, and then calculates charge quantity J of the battery 63 based on the calculated power. The battery state-of-charge detecting unit 74 then operates the following expression to calculate a ratio of charge quantity J to a maximum charge quantity $J_{max}$ of the battery 63, that is a state-of-charge SOC (%), and then outputs the SOC as a calculation result at the battery-charging power setting unit 75, the battery-discharging power setting unit 76, and the generator output power setting unit 77.

$$SOC = \frac{J}{J_{max}} \times 100$$

It should be noted that the SOC of the battery 63 is calculated correcting the voltage $V_b$ between terminals by the temperature $TEMP_b$ of the battery 63 detected at the battery temperature sensor 71 because the voltage $V_b$ detected at the battery voltage sensor 73 depends on temperature.

In addition to above, charge quantity J of the battery 63 may be calculated accumulating voltages $V_b$ between terminals or output currents $I_b$ of the battery 63, instead of accumulating powers.

The battery-charging power setting unit 75 determines maximum value of the charging power for the battery 63 using the temperature $TEMP_b$ of the battery 63 inputted from the battery temperature sensor 71 and the state-of-charge SOC of the battery 63 inputted from the battery state-of-charge SOC detecting unit 74, and outputs the maximum charging power $P_{bc}$ as a determination result at the generator/battery power distribution determining unit 81.

Figure 3:
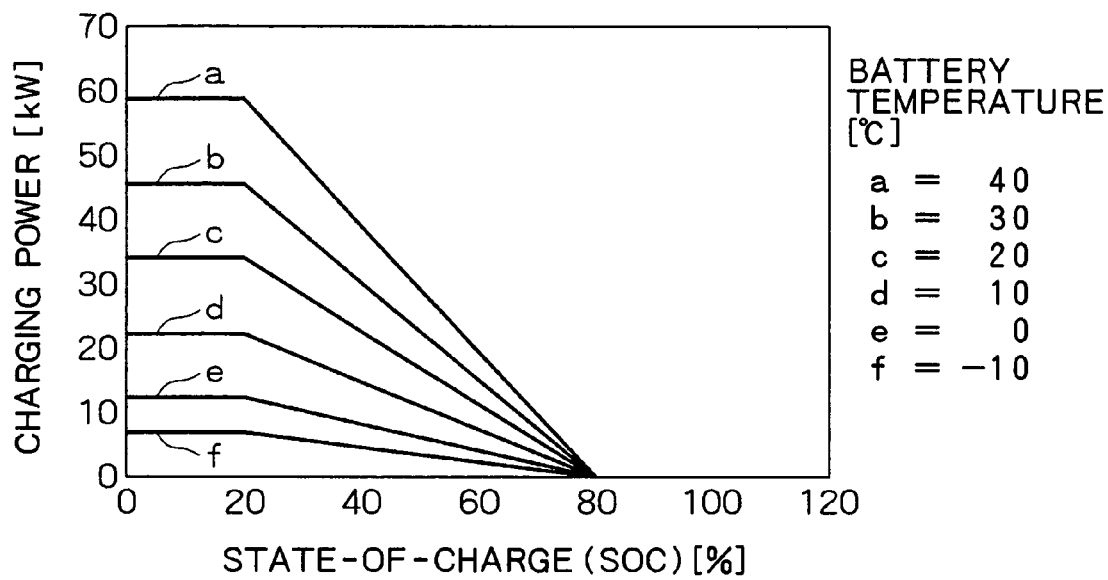
FIG. 3 is a graph showing charging power characteristics of a battery installed in the hybrid excavator shown in FIG. 1 against its state-of-charge SOC.

For details, there are stored predefined values of charging power of the battery 63 against state-of-charge and temperature of the battery 63 in a table (a memory unit) of the battery-charging power setting unit 75 as shown in FIG. 3. In addition, values of charging power above are set not to exceed the charging capacity of the battery 63. Based on the temperature $TEMP_b$ and the state-of-charge SOC of the battery 63, the battery-charging power setting unit 75 takes predefined charging power setting value corresponding to the temperature $TEMP_b$ and the state-of-charge SOC out of the table. The battery-charging power setting unit 75 then determines the taken setting value as a maximum value of charging power (maximum charging power $P_{bc}$) of the battery 63 and outputs $P_{bc}$ at the generator/battery power distribution determining unit 81.

The battery-discharging power setting unit 76 determines maximum value of the discharging power for the battery 63 using the temperature $TEMP_b$ of the battery 63 inputted from the battery temperature sensor 71 and the state-of-charge SOC of the battery 63 inputted from the battery state-of-charge SOC detecting unit 74, and outputs the maximum discharging power $P_{bd}$ as a determination result at the generator/battery power distribution determining unit 81.

Figure 4:
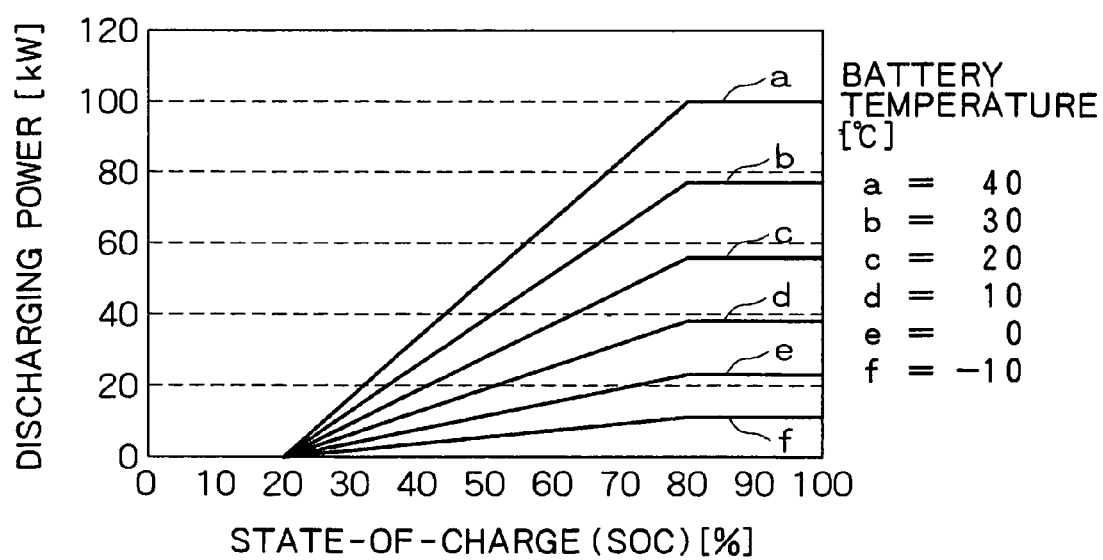
FIG. 4 is a graph showing discharging power characteristics of a battery installed in the hybrid excavator shown in FIG. 1 against its stage-of-charge SOC.

For details, there are stored predefined values of discharging power of the battery 63 against state-of-charge and temperature of the battery 63 in a table (a memory unit) of the battery-discharging power setting unit 76 as shown in FIG. 4. In addition, values of discharging power above are set not to exceed the discharging capacity of the battery 63. Based on the temperature $TEMP_b$ and the state-of-charge SOC of the battery 63, the battery-discharging power setting unit 76 takes predefined discharging power setting value corresponding to the temperature $TEMP_b$ and the state-of-charge SOC out of the table. The battery-discharging power setting unit 76 then determines the taken setting value as a maximum value of discharging power (maximum discharging power $P_{bd}$) of the battery 63 and outputs $P_{bd}$ at the generator/battery power distribution determining unit 81.

The generator output power setting unit 77 determines upper limit value (upper limit $P_{gu}$ of the generator output) and lower limit value (lower limit $P_{gl}$ of the generator output) of the output power of the generator 62 using the state-of-charge SOC of the battery 63 inputted from the battery state-of-charge detecting unit 74, and outputs the upper limit $P_{gu}$ of the generator output and the lower limit $P_{gl}$ of the generator output as a determination result at the generator/battery power distribution determining unit 81.

Figure 5:
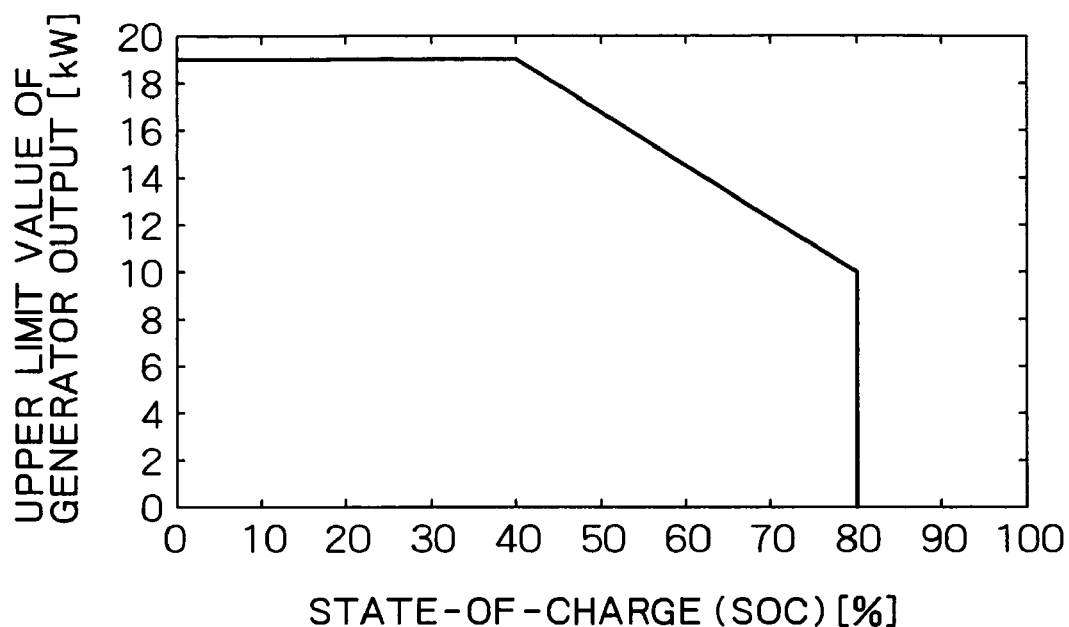
FIG. 5 is a graph showing upper limit characteristics of a generator output against the state-of-charge SOC of the battery installed in the hybrid excavator shown in FIG. 1.
Figure 6:
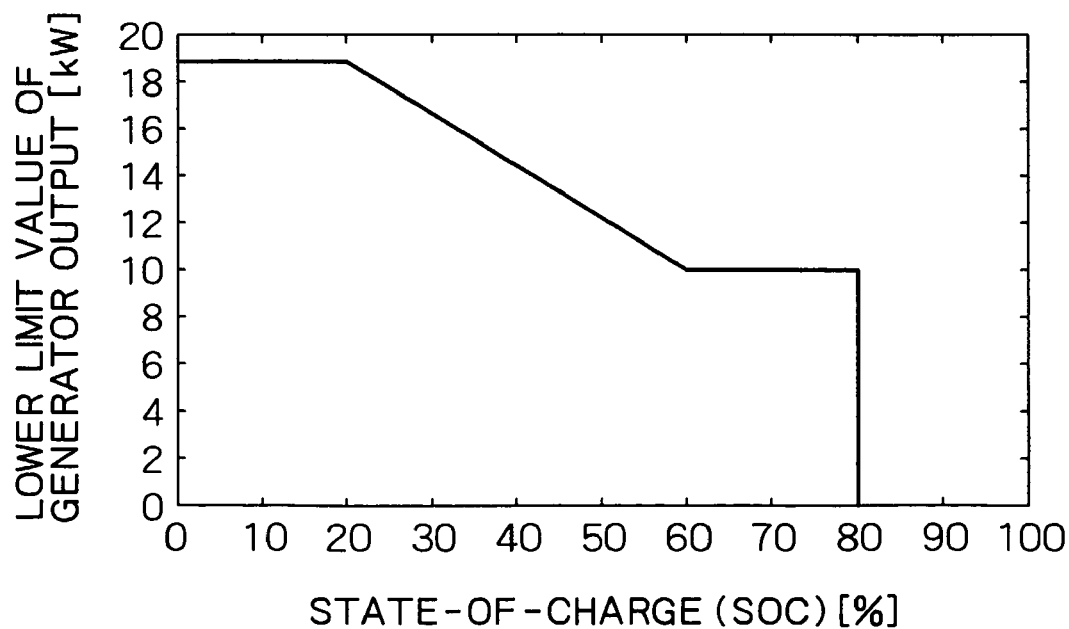
FIG. 6 is a graph showing lower limit characteristics of a generator output against the state-of-charge SOC of the battery installed in the hybrid excavator shown in FIG. 1.

For details, there are stored predefined upper limit values of the generator output against state-of-charge of the battery 63 and predefined lower limit values of the generator output against state-of-charge of the battery 63 in a table (a memory unit) of the generator output power setting unit 77 as shown in FIG. 5 and FIG. 6 respectively. In addition, upper limit values and lower limit values above are set to make efficiencies of the engine 61 and the generator 62 favorable. Based on the state-of-charge SOC of the battery 63, the generator output power setting unit 77 takes predefined upper limit value of the generator output corresponding to the state-of-charge SOC out of the table, and determines the taken upper limit value as an upper limit value of the output power of the generator 62 (upper limit $P_{gu}$ of the generator output). Further, Based on the state-of-charge SOC of the battery 63, the generator output power setting unit 77 takes predefined lower limit value of the generator output corresponding to the state-of-charge SOC out of the table, and determines the taken lower limit value as a lower limit value of the output power of the generator 62 (lower limit $P_{gl}$ of the generator output). Then, the generator output power setting unit 77 outputs determined upper limit $P_{gu}$ of the generator output and lower limit $P_{gl}$ of the generator output at the generator/battery power distribution determining unit 81.

The load voltage sensor 78 detects voltage at an input unit of the electric actuator 64, and outputs load voltage $V_L$ as a detection result at the load power detecting unit 80. The load current sensor 79 detects current at the input unit of the electric actuator 64, and outputs load current $I_L$ as a detection result at the load power detecting unit 80.

The load power detecting unit 80 operates the following expression to detect required power $P_L$ for the electric actuator 64 using the load voltage $V_L$ inputted from the load voltage sensor 78 and the load current $I_L$ inputted from the load current sensor 79, and then outputs the $P_L$ as a detection result at the generator/battery power distribution determining unit 81.

$$P_L = V_L \times I_L$$

The generator/battery power distribution determining unit 81 determines battery power $P_b$ and generator power $P_g$ based on the required power $P_L$ for the electric actuator 64 inputted from the load power detecting unit 80, the maximum charging power $P_{bc}$ inputted from the battery-charging power setting unit 75, the maximum discharging power $P_{bd}$ inputted from the battery-discharging power setting unit 76, the upper limit $P_{gu}$ of the generator output and the lower limit $P_{gl}$ of the generator output inputted from the generator output power setting unit 77. The generator/battery power distribution determining unit 81 then outputs a command signal including the battery power $P_b$ as a determination result at the battery power controlling unit 82 while outputs another command signal including the generator power $P_g$ as a determination result at the generator power controlling unit 83. The processing above will hereinafter be described in detail referring to the flowchart of FIG. 8.

The battery power controlling unit 82 controls charge/discharge of the battery 63 to the battery power $P_b$ included in the command signal inputted from the generator/battery power distribution determining unit 81. The generator power controlling unit 83 also controls generation of the generator 62 to the generator power $P_g$ included in the command signal inputted from the generator/battery power distribution determining unit 81.

Figure 7:
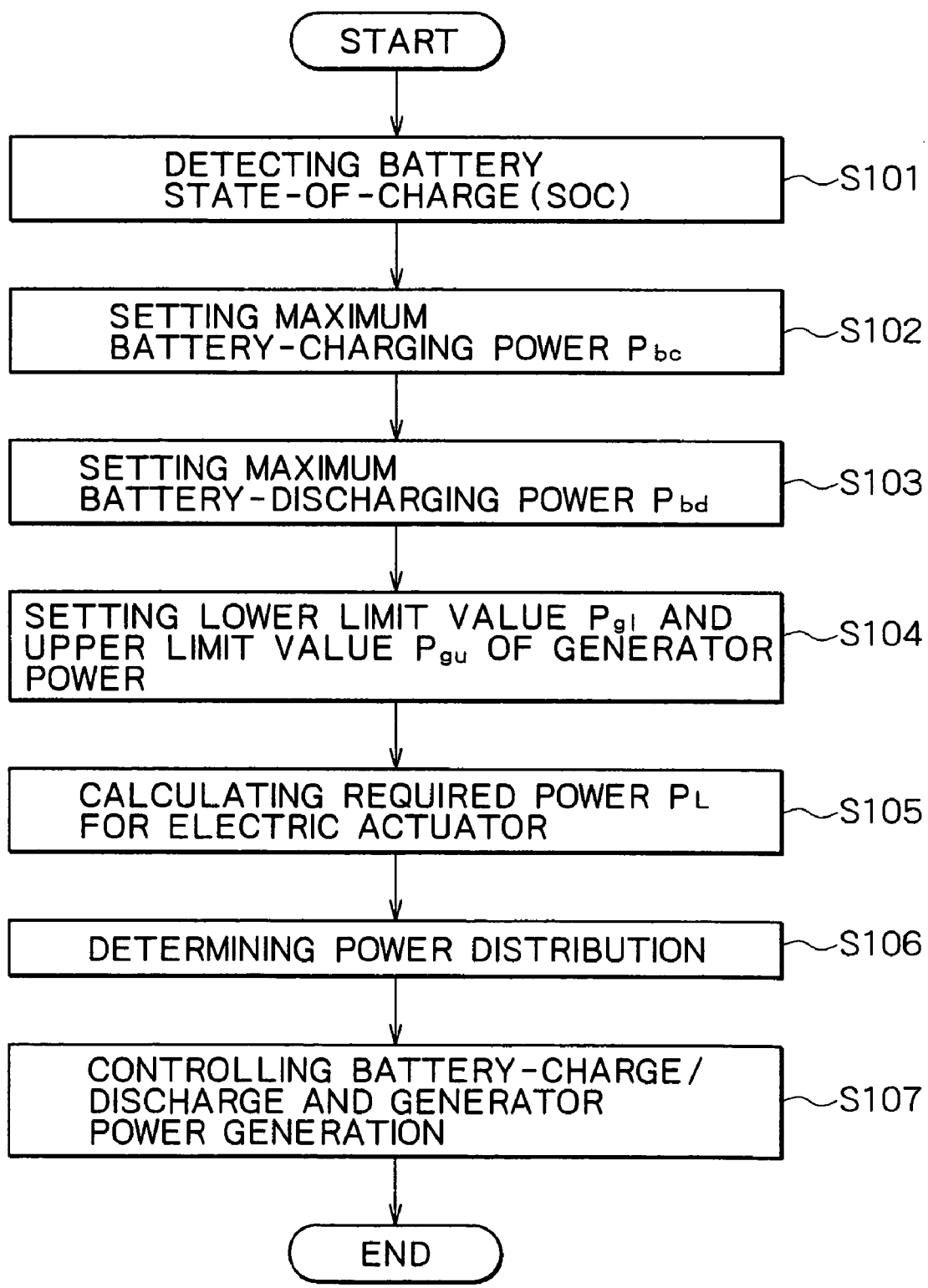
FIG. 7 is a flowchart showing a process of the power controlling method by the power controlling mechanism shown in FIG. 2.
Figure 8:
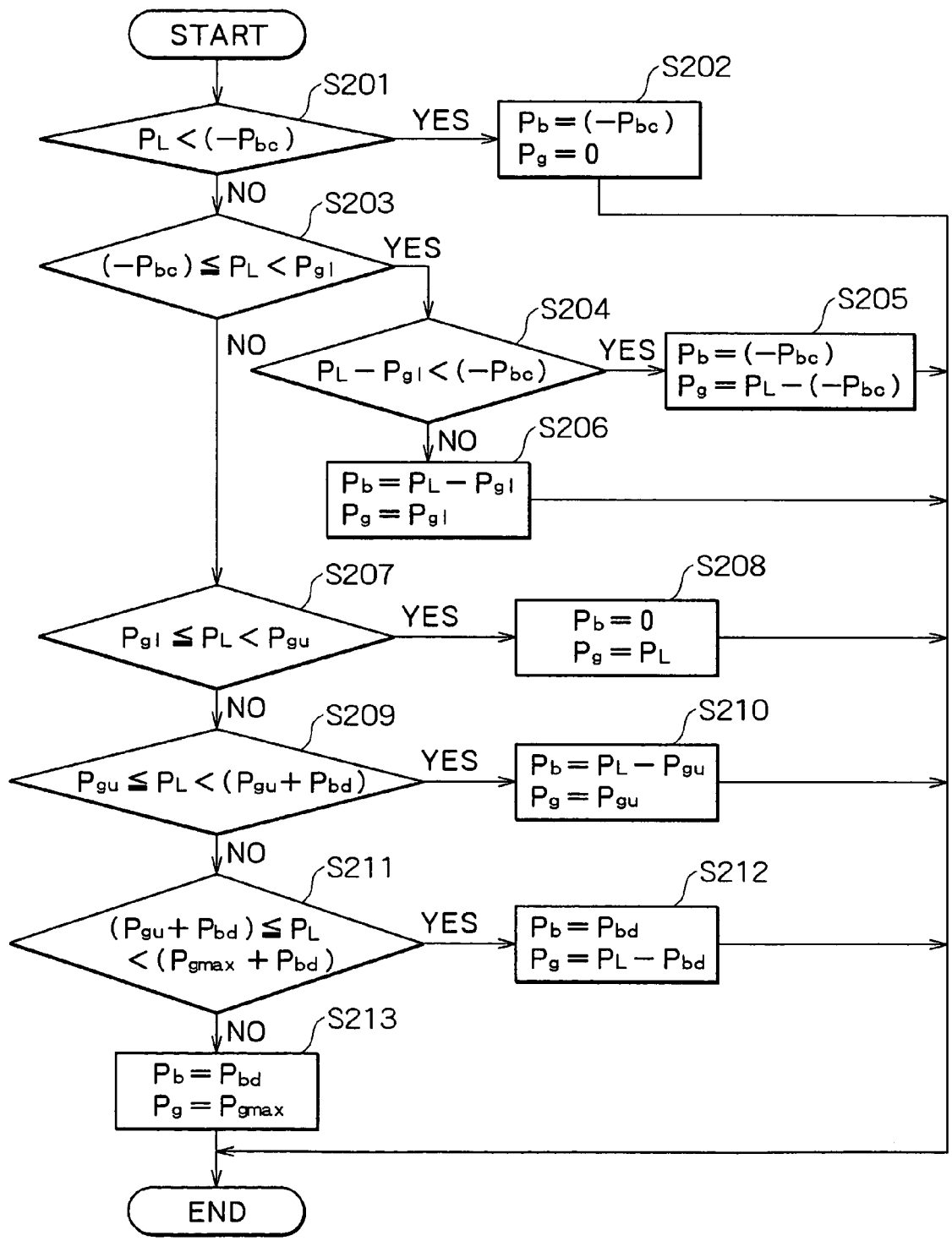
FIG. 8 is a flowchart showing a process of the power distribution determining processing between the generator and the battery shown in the flowchart of FIG. 7.
Figure 9:
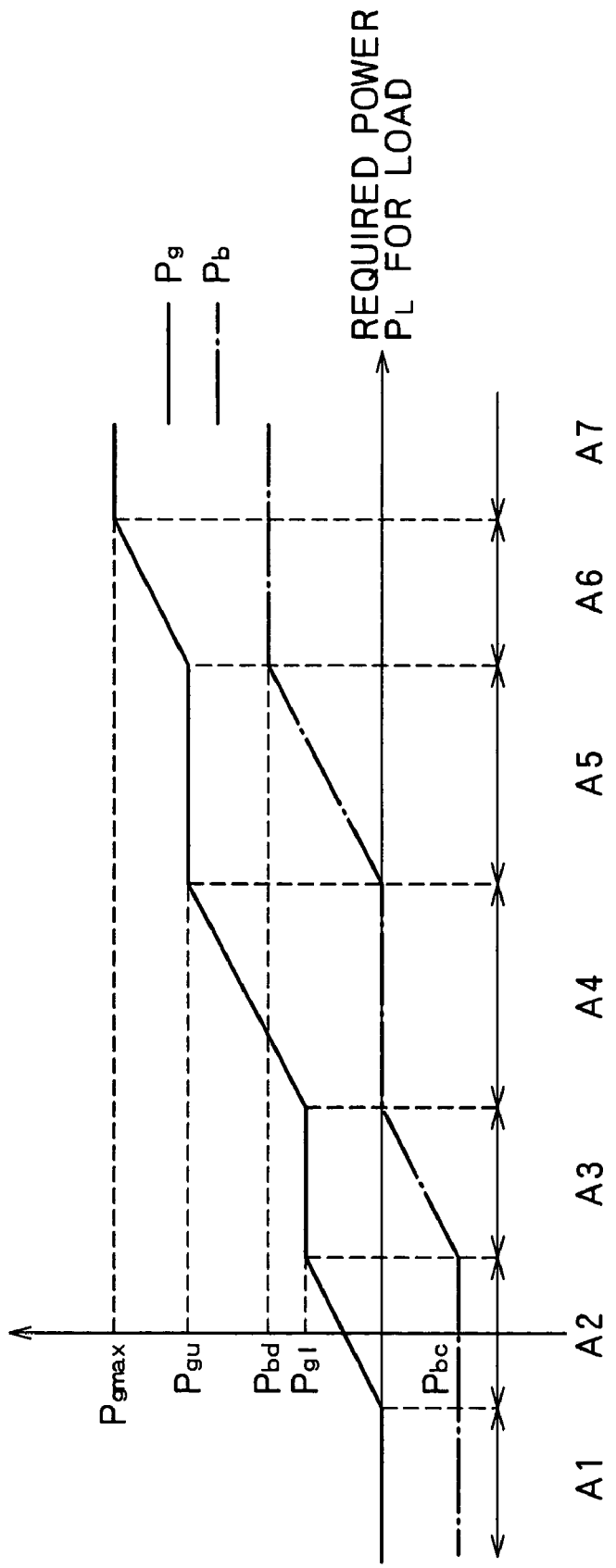
FIG. 9 is an additional illustration of the power distribution determining processing shown in the flowchart of FIG. 8.

Further, a power controlling method in the power controlling mechanism 7, which has the foregoing configuration, will be described referring to FIG. 7, FIG. 8 and FIG. 9. It should be noted that FIG. 7 is a flowchart showing a process of the power controlling method, that FIG. 8 is a flowchart showing a process of the power distribution determining processing between the generator and the battery shown in the flowchart of FIG. 7. FIG. 9 is an illustration of the power distribution determining processing between the generator and the battery, wherein the solid line represents the generator power $P_b$ while the alternate long and short dash line the battery power $P_b$.

In step S101, the battery state-of-charge detecting unit 74 calculates state-of-charge SOC of the battery 63 using the output current $I_b$ of the battery 63 inputted from the battery current sensor 72 and the voltage $V_b$ between terminals of the battery 63 inputted from the battery voltage sensor 73, with the voltage $V_b$ between terminals being corrected by the temperature $TEMP_b$ of the battery 63 inputted from the battery temperature sensor 71. The battery state-of-charge detecting unit 74 then outputs the state-of-charge SOC as a calculation result at the battery-charging power setting unit 75, the battery-discharging power setting unit 76, and the generator output power setting unit 77.

In step S102, the battery-charge power setting unit 75 determines maximum value of the charging power of the battery 63 using the temperature $TEMP_b$ of the battery 63 inputted from the battery temperature sensor 71 and the state-of-charge SOC of the battery 63 inputted from the battery state-of-charge detecting unit 74, and then outputs the maximum charging power $P_{bc}$ at the generator/battery power distribution determining unit 81.

In step S103, the battery-discharging power setting unit 76 determines maximum value of the discharging power of the battery 63 using the temperature $TEMP_b$ of the battery 63 inputted from the battery temperature sensor 71 and the state-of-charge SOC of the battery 63 inputted from the battery state-of-charge detecting unit 74, and then outputs the maximum discharging power $P_{bd}$ at the generator/battery power distribution determining unit 81.

In step S104, the generator output power setting unit 77 determines upper limit value (upper limit $P_{gu}$ of the generator output) and lower limit value (lower limit $P_{gl}$ of the generator output) of the output power of the generator 62 using the state-of-charge SOC of the battery 63 inputted from the battery state-of-charge detecting unit 74, and outputs the upper limit $P_{gu}$ of the generator output and the lower limit $P_{gl}$ of the generator output as a determination result at the generator/battery power distribution determining unit 81.

In step S105, the load power detecting unit 80 detects required power $P_L$ for the electric actuator 64 using the load voltage $V_L$ inputted from the load voltage sensor 78 and the load current $I_L$ inputted from the load current sensor 79, and then outputs the $P_L$ as a detection result at the generator/battery power distribution determining unit 81.

In step S106, the generator/battery power distribution determining unit 81 determines generator power $P_g$ and battery power $P_b$, and then outputs a command signal including the generator power $P_g$ as a determination result at the generator power controlling unit 83 while outputs another command signal including the battery power $P_b$ as a determination result at the battery power controlling unit 83. That is, the generator/battery power distribution determining unit 81 executes a power distribution determining processing between the generator and the battery (refer to FIG. 8).

In step S107, The battery power controlling unit 82 controls charge/discharge of the battery 63 to the battery power $P_b$ indicated by the command signal inputted from the generator/battery power distribution determining unit 81. In contrast, the generator power controlling unit 83 controls generation of the generator 62 to the generator power $P_g$ indicated by the command signal inputted from the generator/battery power distribution determining unit 81.

Next, the power distribution determining processing between the generator and the battery by the power controlling mechanism 7 will be described referring to FIG. 8.

In step S201, the generator/battery power distribution determining unit 81 judges whether or not the required power $P_L$ for the electrical actuator 64 is smaller than the negative value of the maximum charging power $P_{bc}$ of the battery 63 ($P_L<-P_{bc}$). In case the required power $P_L$ is smaller than the negative value of the maximum charging power $P_{bc}$ (step S201: YES), the process moves to step 202 while in case the required power $P_L$ is not smaller than the negative value of the maximum charging power $P_{bc}$ (step S201: NO), the process moves to step 203.

In step S202, the generator/battery power distribution determining unit 81 determines the battery power $P_b$ of the battery 63 and the generator power $P_g$ of the generator 62 as "$-P_b$" and "0" respectively, and then finishes the power distribution determining processing. That is, the battery 63 will be charged by the maximum charging power $P_{bc}$.

In step S203, the generator/battery power distribution determining unit 81 judges whether or not the required power $P_L$ for the electrical actuator 64 is within the range of being bigger than the negative value of the maximum charging power $P_{bc}$ of the battery 63 and smaller than the lower limit $P_{gl}$ of the generator power ($-P_{bc} \leq P_L < P_{gl}$). In case the required power $P_L$ is within the range (step S203: YES), the process moves to step S204 while in case the required power $P_L$ is not within the range (step S203: NO), to step S207.

Following the step above, in step S204, the generator/battery power distribution determining unit 81 judges whether or not the negative value of the maximum charging power $P_{bc}$ of the battery 63 is bigger than the value gotten by subtracting the lower limit $P_{gl}$ of the generator power from the required power $P_L$ for the electric actuator 64 ($P_L-P_{gl}<-P_{bc}$). In case the negative value of the maximum charging power $P_{bc}$ of the battery 63 is bigger than the other value (step S204: YES), the process moves to step S205 while in case the negative value of the maximum charging power $P_{bc}$ of the battery 63 is not bigger than the other value (step S204: NO), to step S206.

In step S205, the generator/battery power distribution determining unit 81 determines the battery power $P_b$ of the battery 63 and the generator power $P_g$ of the generator 62 as "$-P_{bc}$" and "$P_L-(-P_{bc})$" respectively (section A2 in FIG. 9), and then finishes the power distribution determining processing. That is, the battery 63 will be charged by the maximum charging power $P_{bc}$, slack of power required to charge the battery by the maximum charging power $P_{bc}$ being taken up with the generator 62. The reason the generator power $P_g$ of the generator 62 falls below the lower limit $P_{gl}$ of the power of the generator 62 is that the generator 62 should work under the lower limit $P_{gl}$ of the generator power to prevent the battery 63 from being charged by power over the maximum charging power $P_{bc}$ of the battery 63 which may occurs in case the power $P_g$ of the generator 62 is arranged to the lower limit $P_{gl}$ of the generator power.

In step S206, the generator/battery power distribution determining unit 81 determines the battery power $P_b$ of the battery 63 and the generator power $P_g$ of the generator 62 as "$P_L-P_{gl}$" and "$P_{gl}$" respectively (section A3 in FIG. 9), and then finishes the power distribution determining processing. That is, the generator power $P_g$ of the generator 62 will be controlled to the lower limit $P_{gl}$ of the power of the generator 62, surplus of the power generated by the generator 62 charging the battery 63.

in step S207, the generator/battery power distribution determining unit 81 judges whether or not the required power $P_L$ for the electrical actuator 64 is within the range of bigger than the lower limit $P_{gl}$ of the generator power and being the upper limit $P_{gu}$ of the generator power or less ($P_{gl} \leq P_L < P_{gu}$). In case the required power $P_L$ is within the range (step S207: YES), the process moves to step S208 while in case the required power $P_L$ is not within the range (step S207: NO), to step S209.

In step S208, the generator/battery power distribution determining unit 81 determines the battery power $P_b$ of the battery 63 and the generator power $P_g$ of the generator 62 as "0" and "$P_L$" respectively (section A4 in FIG. 9), and then finishes the power distribution determining processing. That is, the generator power $P_g$ of the generator 62 will be within the range of the lower limit $P_{gl}$ of the generator power or more and being smaller than the upper limit $P_{gu}$ of the generator power, the battery 63 neither charging nor discharging.

In step S209, the generator/battery power distribution determining unit 81 judges whether or not the required power $P_L$ for the electric actuator 64 is within the range of being bigger than the upper limit $P_{gu}$ of the generator power and being the value or more gotten by adding the maximum discharging power $P_{bd}$ of the battery 63 to the upper limit $P_{gu}$ of the generator power ($P_{gu} \leq P_L < P_{gu}+P_{bd}$). In case the required power $P_L$ is within the range (step S209: YES), the process moves to step S210 while in case the required power $P_L$ is not within the range (step S209: NO), to step S211.

In step S210, the generator/battery power distribution determining unit 81 determines the battery power $P_b$ of the battery 63 and the generator power $P_g$ of the generator 62 as "$P_L-P_{gu}$" and "$P_{gu}$" respectively (section A5 in FIG. 9), and then finishes the power distribution determining processing. That is, the power $P_g$ generated by the generator 62 will be limited to the upper limit $P_{gu}$ of the generator power, and slack of generation power "$P_L-P_{gu}$" by the generator 62 will be taken up with the battery 63. Moreover, the discharging power of the battery 63 is the maximum discharging power $P_{bd}$ or less.

In step S211, the generator/battery power distribution determining unit 81 judges whether or not the required power $P_L$ for the electric actuator 64 is within the range of being the value gotten by adding the maximum discharging power $P_{bd}$ of the battery 63 to the upper limit $P_{gu}$ of the generator power and being smaller than the value or more gotten by adding the maximum discharging power $P_{bd}$ of the battery 63 to a maximum generator power $P_{gmax}$ ($P_{gu}+P_{bd} \leq P_L < P_{gmax}+P_{bd}$). In case the required power $P_L$ is within the range (step S211: YES), the process moves to step S212 while in case the required power $P_L$ is not within the range (step S211: NO), to step S213. The maximum generator power $P_{gmax}$ is the maximum value of the output power of the generator 62 depending on the performance of the engine 61 and the generator 62.

In step S212, the generator/battery power distribution determining unit 81 determines the battery power $P_b$ of the battery 63 and the generator power $P_g$ of the generator 62 as "$P_{bd}$" and "$P_L-P_{bd}$" respectively (section A6 in FIG. 9), and then finishes the power distribution determining processing. That is, the battery 63 is controlled to discharge at the maximum discharging power $P_{bd}$, while the generator 62 is controlled to generate power of "$P_L-P_{bd}$". The generator 62 works to generate power over the upper limit $P_{gu}$ of the generator power so as to supply the electric actuator 64 with the required power $P_L$ for the electric actuator 64 from the generator 62 and the battery 63.

In step 213, the generator/battery power distribution determining unit 81 determines the battery power $P_b$ of the battery 63 and the generator power $P_g$ of the generator 62 as "$P_{bd}$" and "$P_{gmax}$" respectively (section A7 in FIG. 9), and then finishes the power distribution determining processing. That is, the battery 63 is controlled to discharge at the maximum discharging power $P_{bd}$, while the generator 62 is controlled to generate power of the maximum generator power $P_{gmax}$. In this case, all of the required power $P_L$ for the electric actuator 64 is not supplied for the electric actuator 64.

In accordance with the power controlling mechanism 7 for the hybrid excavator 1 according to the first embodiment of the present invention, the battery 63 is controlled to discharge at the maximum discharging power $P_{bd}$ or less e.g. not exceeding its discharging capacity, and also to charge at the maximum charging power $P_{bc}$ or less e.g. not exceeding its charging capacity, so it is possible to prevent performance deterioration of the battery 63 due to charging/discharging over the battery capacity.

In addition, the output power of the generator 62 is controlled to being within the range between the lower limit $P_{gl}$ of the generator power and the upper limit $P_{gu}$ of the generator power, efficiencies of the engine 61 and the generator 62 being favorable therebetween (except for section A2, A6 and A7 in FIG. 9), so the fuel consumption of the engine 61 is performed.

Further, it is possible to prevent performance deterioration of the battery 63 due to charging/discharging over its capacity as a result of prevention of charging/discharging over the capacity regardless of the state-of-charge of the battery 63, wherein the maximum charging power $P_{bc}$ and the maximum discharging power $P_{bd}$ of the battery 63 are set according to its state-of-charge even through the charging/discharging capacity of the battery 63 varies depending on its state-of-charge. It is also possible to prevent performance deterioration of the battery 63 due to charging/discharging over its capacity as a result of prevention of charging/discharging over the capacity regardless of the temperature of the battery 63, wherein the maximum charging power $P_{bc}$ and the maximum discharging power $P_{bd}$ of the battery 63 are set according to its temperature even though the charging/discharging capacity of the battery 63 varies depending on its temperature.

Second embodiment

A power controller for hybrid excavator according to a second embodiment of the present invention will be described below referring to the accompanying drawings. The hybrid excavator 1 in the first embodiment described using FIG. 1 is available as a hybrid excavator to which a power controller according to the second embodiment is applied.

Figure 10:
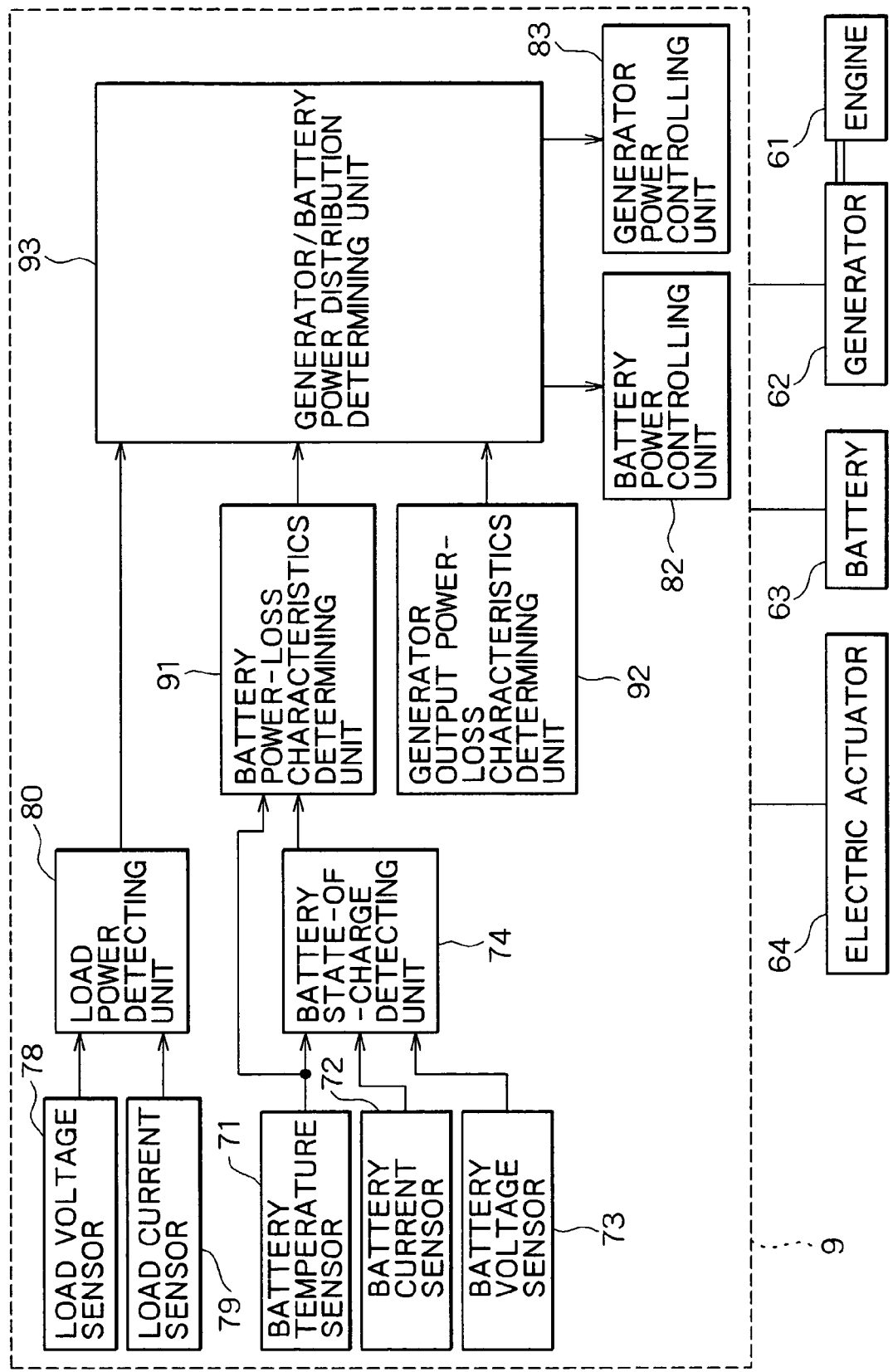
FIG. 10 is a block diagram illustrating another power controlling mechanism of a hybrid excavator according to a second embodiment of the present invention.

At first, a power controlling mechanism of a hybrid excavator according to the second embodiment will be described referring to FIG. 10. It should be noted that FIG. 10 is a block diagram illustrating a power controlling mechanism according to the second embodiment. Elements substantially equal to those in the first embodiment are provided with the same symbols.

The block diagram shown in FIG. 10 consists of an engine 61, a generator 62, a battery 63, an electric actuator 64, and a power controlling mechanism 9. Power supply from the battery 63 to the electric actuator 64 and that from the generator 62 to the electric actuator 64 or the battery 63 are made through DC voltage lines. The electric actuator 64 represents either an integrated actuator A1 for boom, an integrated actuator A2 for arm or a integrated actuator A3 for bucket, etc., only one out of which being illustrated in FIG. 10.

The power controller mechanism 9 shown in FIG. 10 comprises a battery temperature sensor 71, a battery current sensor 72, a battery voltage sensor 73, a battery state-of-charge detecting unit 74, a battery power-loss characteristics determining unit 91, a generator output power-loss characteristics determining unit 92, a load voltage sensor 78, a load current sensor 79, a load power detecting unit 80, a generator/battery power distribution determining unit 93, a battery power controlling unit 82, and a generator power controlling unit 83. Processing details of the battery temperature sensor 71, the battery current sensor 72, the battery voltage sensor 73, the battery state-of-charge detecting unit 74, the load voltage sensor 78, the load current sensor 79, the lower power detecting unit 80, the battery power controlling unit 82, and the generator power controlling unit 83 are substantially equal to those described in the first embodiment.

The battery power-loss characteristics determining unit 91 determines loss characteristics of the battery 63 against input power to the battery 63 using the temperature $TEMP_b$ of the battery 63 inputted from the battery temperature sensor 71 and the state-of-charge SOC of the battery 63 inputted from the battery state-of-charge detecting unit 74, and then outputs coefficients (a, b, c) of quadratic expression in an approximation of the determined characteristics by a quadratic expression at the generator/battery power distribution determining unit 93.

Figure 11:
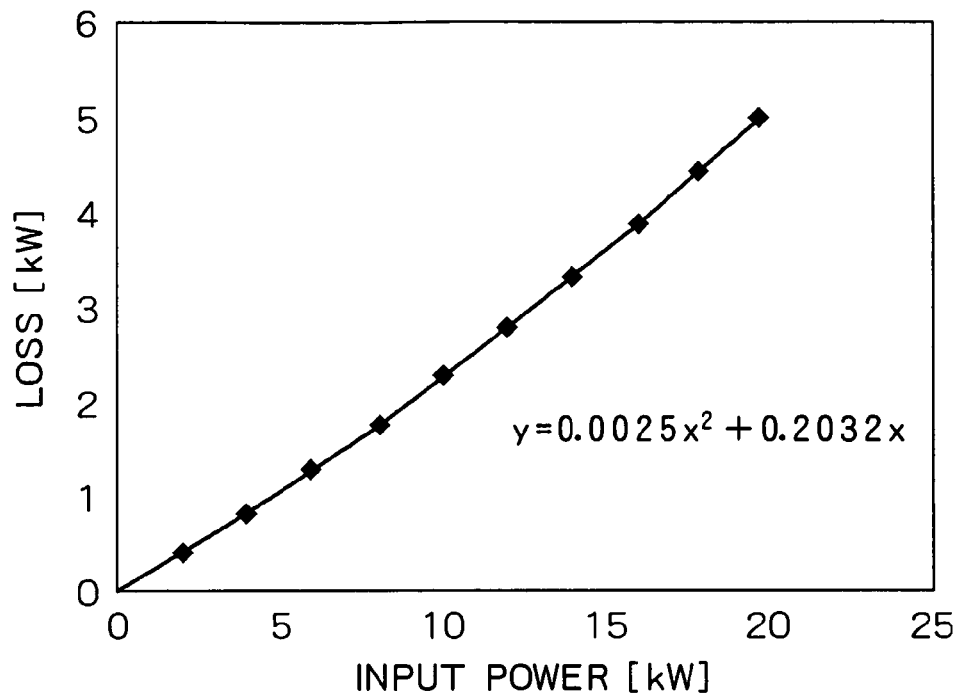
FIG. 11 is a graph showing power loss characteristics of the battery installed in the hybrid excavator shown in FIG. 1 against its input power.
Figure 12:
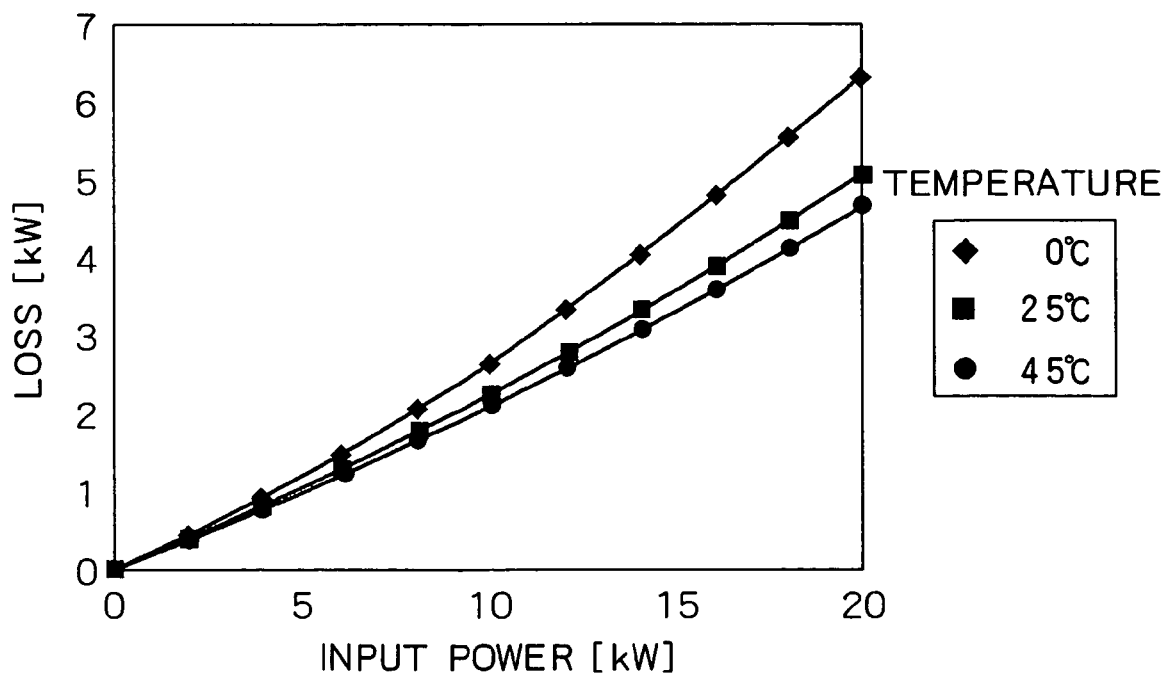
FIG. 12 is a graph showing power loss characteristics of the battery installed in the hybrid excavator shown in FIG. 1 against its input power.

For details, there are stored coefficients (a, b, c) of quadratic expression for state-of-charge SOC and temperature $TEMP_b$ of the battery 63 individually, which are obtained by an approximation of characteristics of power loss $P2_{bross}$ of the battery 63 against input power $P2_b$ to the battery 63 by a quadratic expression represented with the following expression, in a table (a memory unit) of the battery power-loss characteristics determining unit 91 as shown in FIG. 11 and FIG. 12, both of which are precedently obtained by executing experiments etc. In FIG. 11 (a, b, c)=(0.0025, 0.2032, 0). $P2_{bross}=a \times P2_b^2 + b \times P2_b + c$ Based on the temperature $TEMP_b$ and state-of-charge SOC of the battery 63, the battery power-loss characteristics determining unit 91 then takes coefficients (a, b, c) corresponding to the temperature $TEMP_b$ and the state-of-charge SOC out of the table. The battery power-loss characteristics determining unit 91 outputs the taken coefficients (a, b, c) at the generator/battery power distribution determining unit 93.

Figure 13:
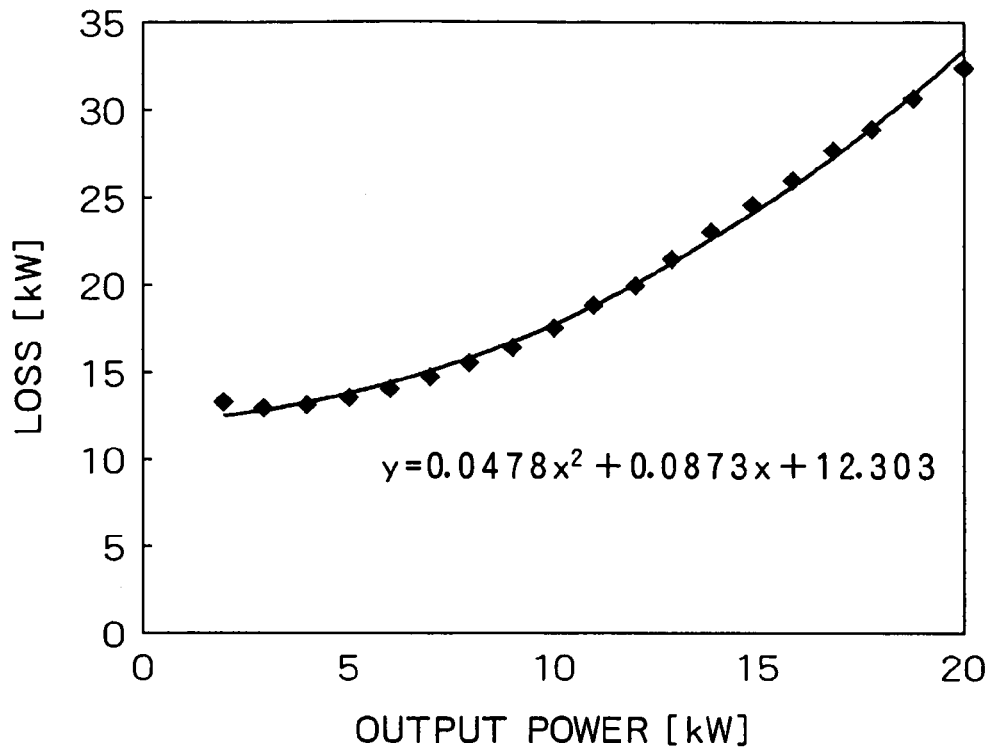
FIG. 13 is a graph showing power loss characteristics of the generator and the battery installed in the hybrid excavator shown in FIG. 1 against the output power of the generator.

There are stored coefficients (α, β, γ) of quadratic expression, which are obtained by an approximation of characteristics of power loss $P2_{gross}$ of the engine and the generator 62 against output power $P2_g$ of the generator 62 by a quadratic expression represented with the following expression, in a table (a memory unit) of the generator output power-loss characteristics determining unit 92 as shown in FIG. 13, which is precedently obtained by executing experiments etc. Then, the battery power-loss characteristics determining unit 91 outputs the precedently stored coefficients (α, β, γ) at the generator/battery power distribution determining unit 93. In FIG. 13, (α, β, γ)=(0.00478, 0.0873, 12.303).

$$P2_{gross} = \alpha \times P2_g^2 + \beta \times P2_g + \gamma$$

Based on the coefficients (a, b, c) input from the battery power-loss characteristics determining unit 91, the coefficients (α, β, γ) inputted from the generator output power-loss characteristics determining unit 92, and the required power $P2_L$ for the electric actuator 64 inputted from the load power detecting unit 80, the generator/battery power distribution determining unit 93 determines input power $P2_b$ of the battery 63 and output power $P2_g$ of the generator 62. Then, the generator/battery power distribution determining unit 93 outputs a command signal including the input power $P2_b$ of the battery 63 as a determination result at the battery power controlling unit 82 while outputs a command signal including the output power $P2_g$ of the generator 62 at the generator power controlling unit 83.

Figure 14:
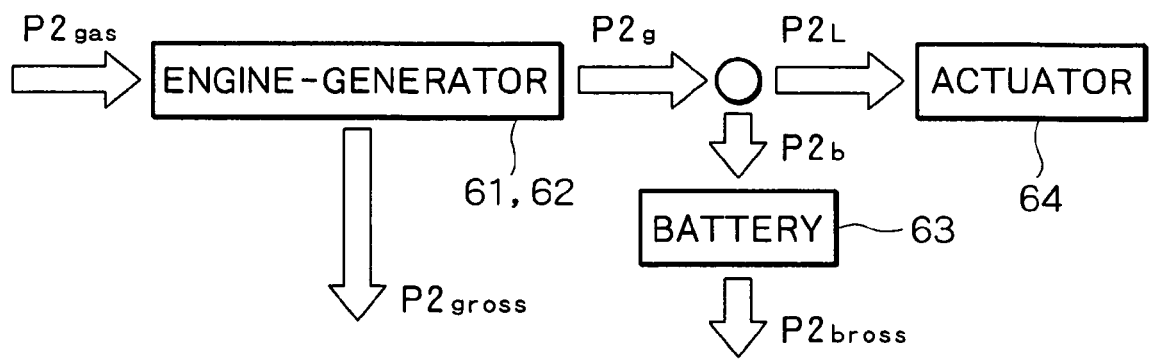
FIG. 14 is a diagram illustrating the power distribution determining method by the power controlling mechanism shown in FIG. 10.

The power distribution determining method by the generator/battery power distribution determining unit 93 will hereinafter be described referring to FIG. 14. It should be noted that FIG. 14 is a diagram illustrating the power distribution determining method. In FIG. 14, power consumption $P2_{gas}$ represents the power consumed by the engine 61 while power loss $P2_{gross}$ the power the engine 61 and the generator 62 lose, output power $P2_g$ the power the generator 62 outputs, input power $P2_b$ the power input to the battery 63, power loss $P2_{bross}$ the power the battery 63 lose, and power consumption $P2_L$ the power consumed by the electric actuator 64.

Total power loss $P2_{tross}$ in the system shown in FIG. 14 is represented with the following expression (1).

$$P2_{tross} = P2_{gross} + P2_{bross} \tag{1}$$

In addition, an available charging power $P2_{bval}$ of the battery 63, which is available for driving the electric actuator 64 out of the input power $P2_b$ of the battery 63, is represented with the following expression (2).

$$P2_{bval} = P2_b - P2_{bross} \tag{2}$$

Further, efficiency η of the entire system shown in FIG. 14 is represented with the following expression (3).

$$\eta = \frac{P2_L + P2_{bavl}}{P2_{gas}} = \frac{P2_L + P2_b - P2_{bross}}{P2_g + P2_{gross}} = \frac{P2_g - P2_{bross}}{P2_g + P2_{gross}} \tag{3}$$

As described above, characteristics of power loss $P2_{bross}$ against input power $P2_b$ of the battery 63 and characteristics of power loss $P2_{gross}$ of the engine and the generator against output power $P2_g$ of the generator 62 are approximated by quadratic expressions represented with the following expressions (4) and (5) respectively.

$$P2_{bross} = a \times P2_b^2 + b \times P2_b + c \qquad (4)$$

$$P2_{gross} = \alpha \times P2_g^2 + \beta \times P2_g + \gamma \qquad (5)$$

In addition, output power $P2_g$ of the generator 62, input power $P2_b$ of the battery 63, and power consumption $P2_L$ of the electric actuator 64 satisfy the following relationship represented with the expression (6).

$$P2_b = P2_g - P2_L \qquad (6)$$

The following expression (7) is obtained by transforming the foregoing expression (3) using the foregoing expression (4), (5), and (6).

$$\eta = \frac{-a \times P2_g^2 + (1 - b + 2 \times a \times P2_L) \times P2_g + b \times P2_L - c - a \times P2_g^2}{\alpha \times P2_g^2 + (1 + \beta) \times P2_g + \gamma} \qquad (7)$$

Output power $P2_g$ of the generator that maximizes the $\eta$ obtained by the foregoing expression (7) is obtained by the following expression (8) under conditions $P2_g \geq 0$ and $P2_b \geq 0$.

$$\frac{d\eta}{dP2_g} = 0 \qquad (8)$$

This expression (8) leads to a relationship represented with the following expression (9).

$$k \times P2_g^2 + 1 \times P2_g + m = 0 \qquad (9)$$

where k = −2×a×α×P2$_L$ − a×β + b×α − a − α
1 = 2×a×α×P2$_L^2$ − 2×b×α×P2$_L$ − 2×a×γ + 2×c×α
m = c + c×β + γ − b×γ − b×P2$_L$ − b×β×P2$_L$ + 2×a×γ×P2$_L$ + a× P2$_L^2$ + a×β×P2$_L^2$ A solution represented by the following expression (10) is obtained by solving the foregoing expression (9).

$$P2_g = \frac{-1 + \sqrt{1^2 - 4 \times k \times m}}{2 \times k} \qquad (10)$$

Further, output power $P2_g$ of the generator 62 is calculated substituting the power consumption (required power) $P2_L$ of the electric actuator 64 detected by the load power detecting unit 80 for the foregoing expression (10). Furthermore, input power $P2_b$ of the battery 62 is calculated substituting the power consumption $P2_L$ of the electric actuator 64 and the output power $P2_g$ for the foregoing expression (6).

Efficiency $\eta$ of the entire system is best improved and fuel consumption of the engine is also improved by controlling generation and charge by the generator 62 and the battery 63 respectively to the output power $P2_g$ of the generator and the input power $P2_g$ of the battery as calculated above.

Figure 15:
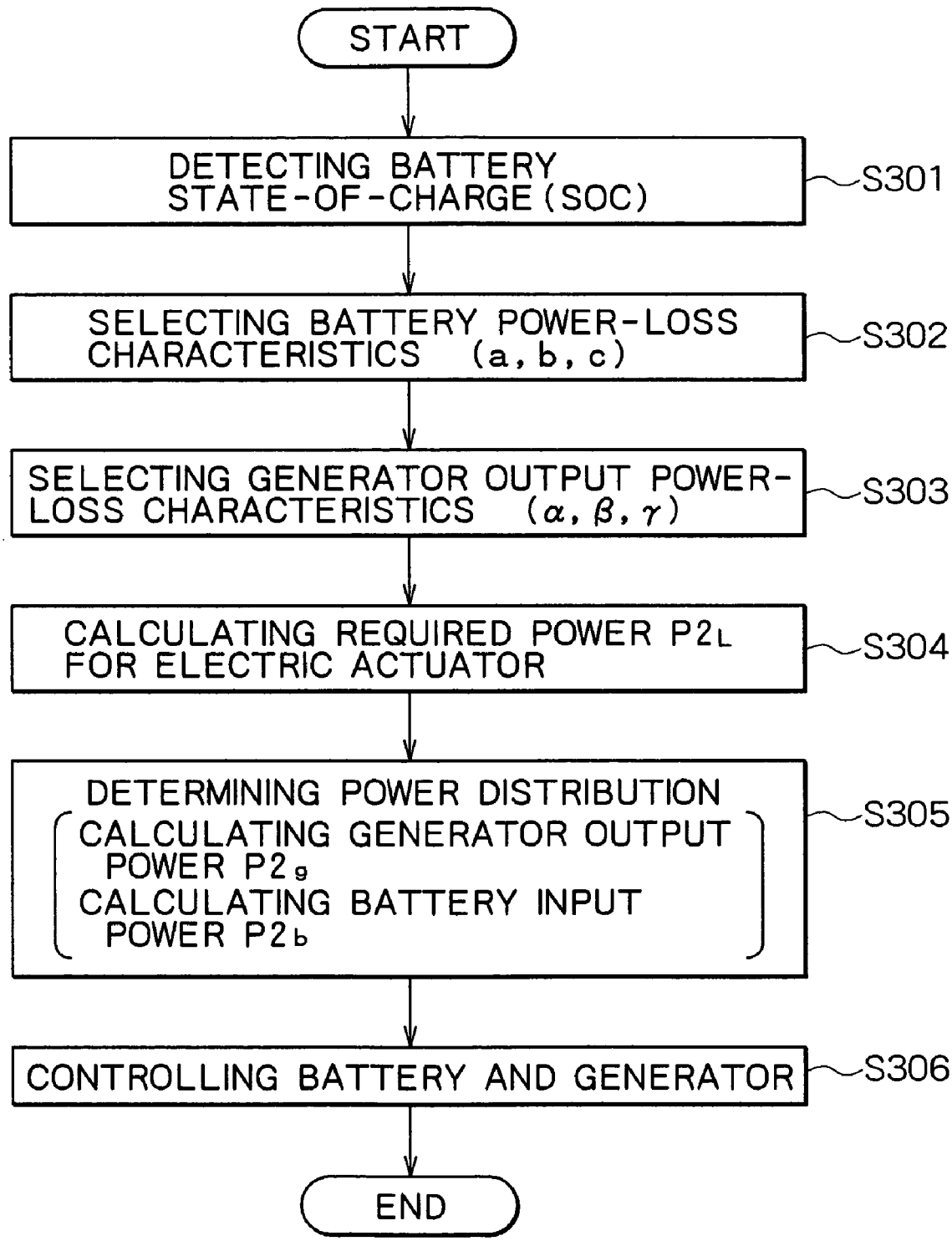
FIG. 15 is a flowchart showing a process of the power controlling method by the power controlling mechanism shown in FIG. 10.

In addition, a power controlling method in the power controlling mechanism 9, which has the foregoing configuration, will hereinafter be described referring to FIG. 15. It should be noted that FIG. 15 is a flowchart showing a process of the power controlling method by the power controlling mechanism shown in FIG. 10.

In step S301, the battery state-of-charge detecting unit 74 calculates state-of-charge SOC of the battery 63 using the output current $I_b$ of the battery 63 inputted from the battery current sensor 72 and the voltage $V_b$ between terminals of the battery 63 inputted from the battery voltage sensor 73, with the voltage $V_b$ between terminals being corrected by the temperature $TEMP_b$ of the battery 63 inputted from the battery temperature sensor 71, and then outputs the state-of-charge SOC as a calculation result at the battery power-loss characteristics determining unit 91.

In step S302, the battery power-loss characteristics determining unit 91 determines coefficients (a, b, c) of quadratic expression in an approximation of loss characteristics of the battery 63 using the temperature $TEMP_b$ of the battery 63 inputted from the battery temperature sensor 71 and the state-of-charge SOC of the battery 63 inputted from the battery state-of-charge detecting unit 74, and then outputs the coefficients (a, b, c) as a determination result at the generator/battery power distribution determining unit 93.

In step S303, the generator output power-loss characteristics determining unit 92 determines coefficients ($\alpha$, $\beta$, $\gamma$) of quadratic expression in an approximation of loss characteristics of the engine 61 and the generator 62, and then outputs the coefficients ($\alpha$, $\beta$, $\gamma$) as a determination result at the generator/battery power distribution determining unit 93.

In step S304, the load power detecting unit 80 detects required power $P2_L$ for the electric actuator 64 based on the load voltage inputted from the load voltage sensor 78 and the load current inputted from the load current sensor 79, and then outputs the required power $P2_L$ at the generator/battery power distribution determining unit 93.

In step S305, the generator/battery power distribution determining unit 93 calculates output power $P2_g$ of the generator by operating the foregoing expression (10) using the required power $P2_L$ for the electric actuator 64, the coefficients (a, b, c) inputted from the battery power-loss characteristics determining unit 91, and the coefficients ($\alpha$, $\beta$, $\gamma$) inputted from the generator output power-loss characteristics determining unit 92. Then, the generator/battery power distribution determining unit 93 outputs a command signal including the calculated output power $P2_g$ at the generator power controlling unit 83. In addition, the generator/battery power distribution determining unit 93 calculates input power $P2_b$ of the battery 63 by operating the foregoing expression (6) using the required power $P2_L$ for the electric actuator 64 and the calculated output power $P2_g$ of the generator 62, and then outputs another command signal including the calculated input power $P2_b$ at the battery power controlling unit 82.

In step S306, the battery power controlling unit 82 controls charge of the battery 63 to the input power $P2_b$ indicated by the command signal input from the generator/battery power distribution determining unit 93. In contrast, the generator power controlling unit 83 controls generation of the generator 62 to the input power $P2_g$ indicated by the command signal inputted from the generator/battery power distribution determining unit 93.

In accordance with the power controlling mechanism 9 for the hybrid excavator 1 according to the second embodiment of the present invention, total energy loss of the hybrid construction machine is reduced and then fuel consumption of the engine is improved, wherein the output power of the generator 62 and the input power of the battery 61 are determined taking into consideration loss characteristics of the generator 62 and the engine 61 against output of the generator 62, and loss characteristics of the battery 61 against input power.

Although preferred embodiments for the present invention are described above, the invention is not restrictive to the present embodiments and various design changes may come within the meaning and range of equivalency of the claims.

INDUSTRIAL APPLICABILITY

The power controller described above is applicable to a hybrid construction machine such as a hybrid excavator and the like including a generator and an electrical energy storage unit.

The invention claimed is:

1. A power controller for hybrid construction machine including an engine, a generator which is driven by said engine, an electrical energy storage unit to store electric power generated by said generator, and one or more electric actuators driven by said generator and said electrical energy storage unit, characterized by comprising:
   a load power detecting means to detect required power for said one or more electric actuators;
   a charging power setting means to set maximum value of charging power of said electrical energy storage unit;
   a discharging power setting means to set maximum value of discharging power of said electrical energy storage unit;
   a generator output power setting means to set upper limit and lower limit value of output power of said generator;
   a power distribution determining means to determine power distribution between said generator and said electrical energy storage unit based on the set value by said charging power setting means, the set value by said discharging power setting means, the set value by said generator output power setting means, and the detection result by said load power detecting means;
   a generator power controlling means to control the output power of said generator based on the determination result by said power distribution determining means; and
   a power controlling means for electrical energy storage unit to control charging/discharging power of said electrical energy storage unit based on the determination result by said power distribution determining means.

2. The power controller for hybrid construction machine according to claim 1, characterized by further comprising a state-of-charge detecting means to detect state-of-charge of said electrical energy storage unit, wherein said generator output power setting means sets upper limit and lower limit value of the output power of said generator based on the detection result by said state-of-charge detecting means.

3. The power controller for hybrid construction machine according to claim 1, characterized by further comprising a state-of-charge detecting means to detect state-of-charge of said electrical energy storage unit, wherein said charging power setting means sets maximum value of the charging power of said electrical energy storage unit based on the detection result by said state-of-charge detecting means, and said discharging power setting means sets maximum value of the discharging power of said electrical energy storage unit based on the detection result by said state-of-charge detecting means.

4. The power controller for hybrid construction machine according to claim 1, characterized by further comprising a temperature detecting means to detect temperature of said electrical energy storage unit, wherein said charging power setting means sets maximum value of the charging power of said electrical energy storage unit based on the detection result by said temperature detecting means, and said discharging power setting means sets maximum value of the discharging power of said electrical energy storage unit based on the detection result by said temperature detecting means.

5. A power controller for hybrid construction machine including an engine, a generator which is driven by said engine, an electrical energy storage unit to store electric power generated by said generator, and one or more electric actuators driven by said generator and said electrical energy storage unit, characterized by comprising:
   a load power detecting means to detect required power for said one or more electric actuators;
   a power distribution determining means to determine power distribution between said generator and said electrical energy storage unit to maximize power consumption efficiency by said engine, utilizing the required power detected by said load power detecting means, loss characteristics of said generator and said engine against an output power of said generator, and loss characteristics of said electrical energy storage unit against an input power of said electrical energy storage unit;
   a generator power controlling means to control the output power of said generator based on the determination result by said power distribution determining means; and
   a power controlling means for electrical energy storage unit to control the input power of said electrical energy storage unit based on the determination result by said power distribution determining means.

6. The power controller for hybrid construction machine according to claim 5, characterized by further comprising:
   a temperature detecting means to detect temperature of said electrical energy storage unit; and
   a power loss characteristics determining means for electrical energy storage unit to determine the loss characteristics of said electrical energy storage unit against the input power of said electrical energy storage unit based on the detection result by said temperature detecting unit.

7. The power controller for hybrid construction machine according to claim 5, characterized by further comprising:
   a state-of-charge detecting means to detect state-of-charge of said electrical energy storage unit; and
   a power loss characteristics determining means for electrical energy storage unit to determine the loss characteristics of said electrical energy storage unit against the input power of said electrical energy storage unit based on the detection result by said state-of-charge detecting unit.

* * * * *